(12) United States Patent
Ujiie et al.

(10) Patent No.: US 11,050,904 B2
(45) Date of Patent: Jun. 29, 2021

(54) CAMERA PLATFORM APPARATUS

(71) Applicant: CANON KABUSHIKI KAISHA, Tokyo (JP)

(72) Inventors: Hirotaka Ujiie, Yokohama (JP); Atsushi Miura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/845,634

(22) Filed: Apr. 10, 2020

(65) Prior Publication Data

US 2020/0344385 A1 Oct. 29, 2020

(30) Foreign Application Priority Data

Apr. 26, 2019 (JP) .............................. JP2019-086273

(51) Int. Cl.
*H04N 5/225* (2006.01)
*G03B 17/56* (2021.01)
*F16M 11/04* (2006.01)
*G08B 13/196* (2006.01)

(52) U.S. Cl.
CPC ......... *H04N 5/2251* (2013.01); *F16M 11/043* (2013.01); *G03B 17/561* (2013.01); *G08B 13/1963* (2013.01); *G08B 13/19619* (2013.01); *H04N 5/2253* (2013.01); *H04N 5/22521* (2018.08)

(58) Field of Classification Search
CPC ............ H04N 5/2253; G08B 13/19619; G08B 13/1963; G08B 13/19617; G08B 13/19632; F16M 11/043; F16M 11/06; F16M 11/12; F16M 11/126; F16M 11/04; F16M 13/04
See application file for complete search history.

(56) References Cited

U.S. PATENT DOCUMENTS

| | | | | |
|---|---|---|---|---|
| 7,755,668 B1 * | 7/2010 | Johnston | ............ | H04N 5/23293 348/211.4 |
| 8,066,438 B2 * | 11/2011 | Takahashi | ............ | H04N 5/2251 396/427 |
| 8,379,089 B2 * | 2/2013 | Lee | ...................... | H04N 5/2251 348/151 |
| 8,767,120 B2 * | 7/2014 | Takizawa | ............ | H04N 5/23264 348/374 |
| 9,042,714 B2 * | 5/2015 | Aiba | ...................... | F16M 11/10 396/20 |
| 9,699,359 B2 * | 7/2017 | Urano | ................... | H04N 5/2256 |
| 9,736,376 B1 * | 8/2017 | Holway | ................... | F16M 11/10 |

(Continued)

FOREIGN PATENT DOCUMENTS

JP H0815770 A 1/1996

*Primary Examiner* — John Villecco
(74) *Attorney, Agent, or Firm* — Canon U.S.A., Inc. IP Division (57) ABSTRACT

There is provided a camera platform apparatus including a base unit, a rotation unit rotatable with respect to the base unit, a stand being connected to the rotation unit and being capable of fixing an image pickup unit, and a plurality of receiving sections configured to receive a plurality of detachable protective units. Among the plurality of receiving sections, a first receiving section is provided on a first side in a rotation axis direction of the rotation unit, and a second receiving section is provided on a second side in the rotation axis direction of the rotation unit.

7 Claims, 8 Drawing Sheets

(56) References Cited

U.S. PATENT DOCUMENTS

| | | | |
|---|---|---|---|
| 9,779,598 B2* | 10/2017 | DiPoala | G08B 13/19691 |
| 10,255,776 B2* | 4/2019 | Stark | G08B 13/1963 |
| 10,331,019 B2* | 6/2019 | Bingleman | G03B 15/02 |
| 2005/0195282 A1* | 9/2005 | Wei | H04N 5/2251 |
| | | | 348/207.99 |
| 2008/0012980 A1* | 1/2008 | Yamane | G08B 13/19632 |
| | | | 348/373 |
| 2011/0013900 A1* | 1/2011 | Takahashi | H04N 5/2251 |
| | | | 396/427 |
| 2012/0243861 A1* | 9/2012 | Svensson | H04N 7/183 |
| | | | 396/427 |
| 2013/0169805 A1* | 7/2013 | Park | H04N 7/185 |
| | | | 348/143 |
| 2018/0356710 A1* | 12/2018 | Bingleman | G08B 13/19632 |
| 2020/0133098 A1* | 4/2020 | Miura | F16M 11/125 |
| 2020/0133099 A1* | 4/2020 | Ujiie | H04N 5/23206 |
| 2020/0133100 A1* | 4/2020 | Yokoi | F16C 19/54 |

* cited by examiner

CAMERA PLATFORM APPARATUS

BACKGROUND OF THE DISCLOSURE

Field of the Disclosure

The present disclosure relates to a camera platform controllable so that an image pickup unit is capable of at least one of a panning rotation, a tilting rotation, and a rolling rotation.

Description of the Related Art

In recent years, there are an image pickup unit for capturing an image by remote operation, and a camera platform system for driving the image pickup unit in a roll direction. It is preferable that the camera platform apparatus has a structure usable both indoors and outdoors; however, if the camera platform apparatus is used in bad weather, it may not be possible to capture an image due to entering of water or the like.

An example of conventional waterproofing applied to a camera platform system includes a method of protecting the camera platform system with a rain cover.

Japanese Patent Application Laid-Open No. H08-015770 discusses a rain cover installed to cover the whole of a camera platform drive camera.

When the rain cover discussed in Japanese Patent Application Laid-Open No. H08-015770 is attached to the camera platform apparatus, the rain cover is mounted to cover the whole of a camera and a lens. Therefore, when the rain cover is used for the camera platform apparatus that drives a rotator of the image pickup unit, the rain cover may be twisted due to friction with a rotating member to negatively affect an operation of the camera platform.

SUMMARY OF THE DISCLOSURE

According to an aspect of the present disclosure, a camera platform apparatus includes a base unit, a rotation unit rotatable with respect to the base unit, a stand being connected to the rotation unit and being capable of fixing an image pickup unit, and a plurality of receiving sections configured to receive a plurality of detachable protective units, in which among the plurality of receiving sections, a first receiving section is provided on a first side in a rotation axis direction of the rotation unit, and a second receiving section is provided on a second side in the rotation axis direction of the rotation unit.

Further features and aspects of the present disclosure will become apparent from the following description of example embodiments with reference to the attached drawings.

DESCRIPTION OF THE EMBODIMENTS

First Example Embodiment

A first example embodiment of the present disclosure will be described below in detail with reference to accompanying drawings.

In the present example embodiment, description is given to a camera platform apparatus, mounting an image pickup unit, for driving a rotator, in particular, a camera platform apparatus capable of waterproofing the image pickup unit and an image pickup optical system connected to the image pickup unit and capable of mounting a protective unit that reduces a negative effect on an operation during rotational drive.

Figure 1:
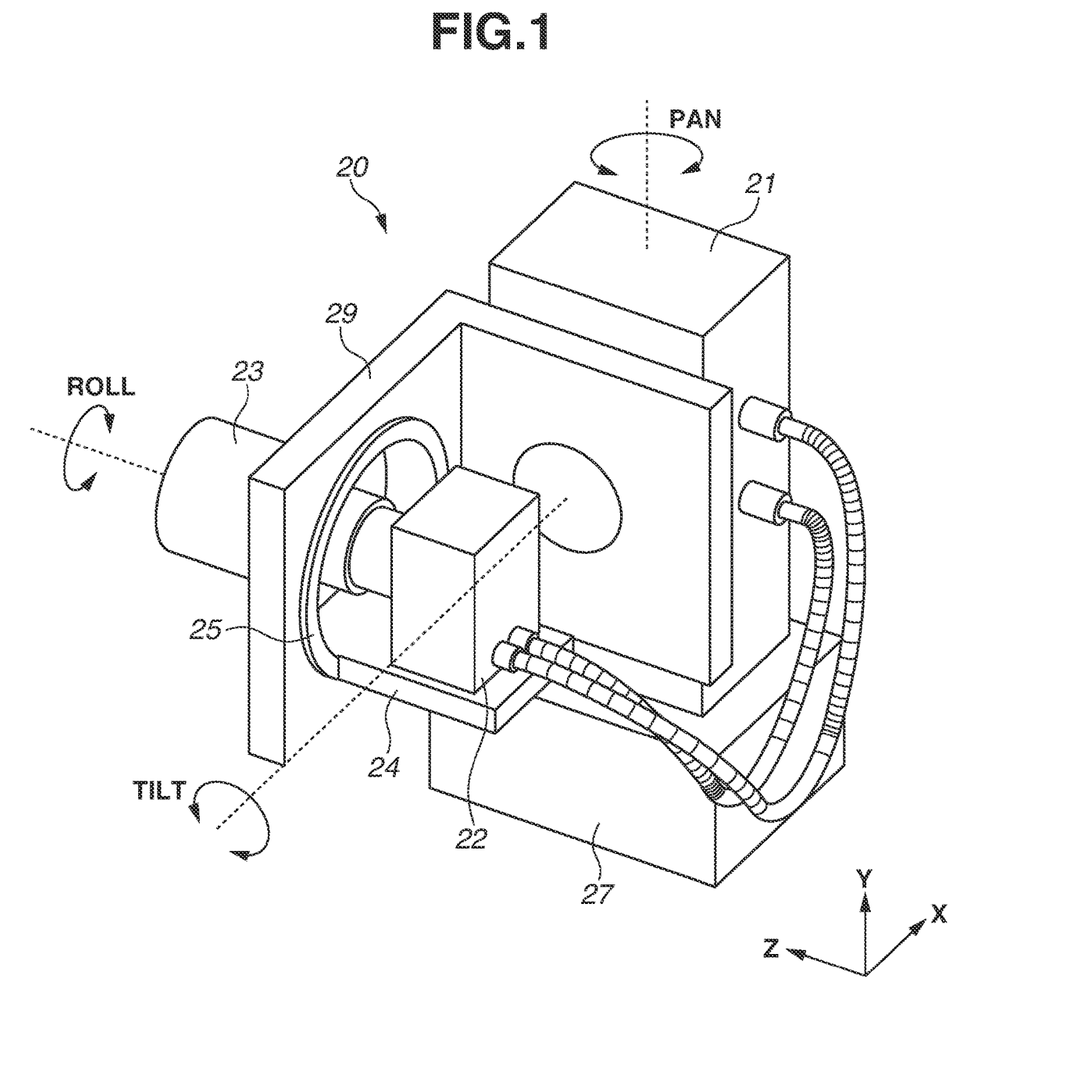
FIG. 1 is a perspective view of a camera platform apparatus according to a first example embodiment.
Figure 2:
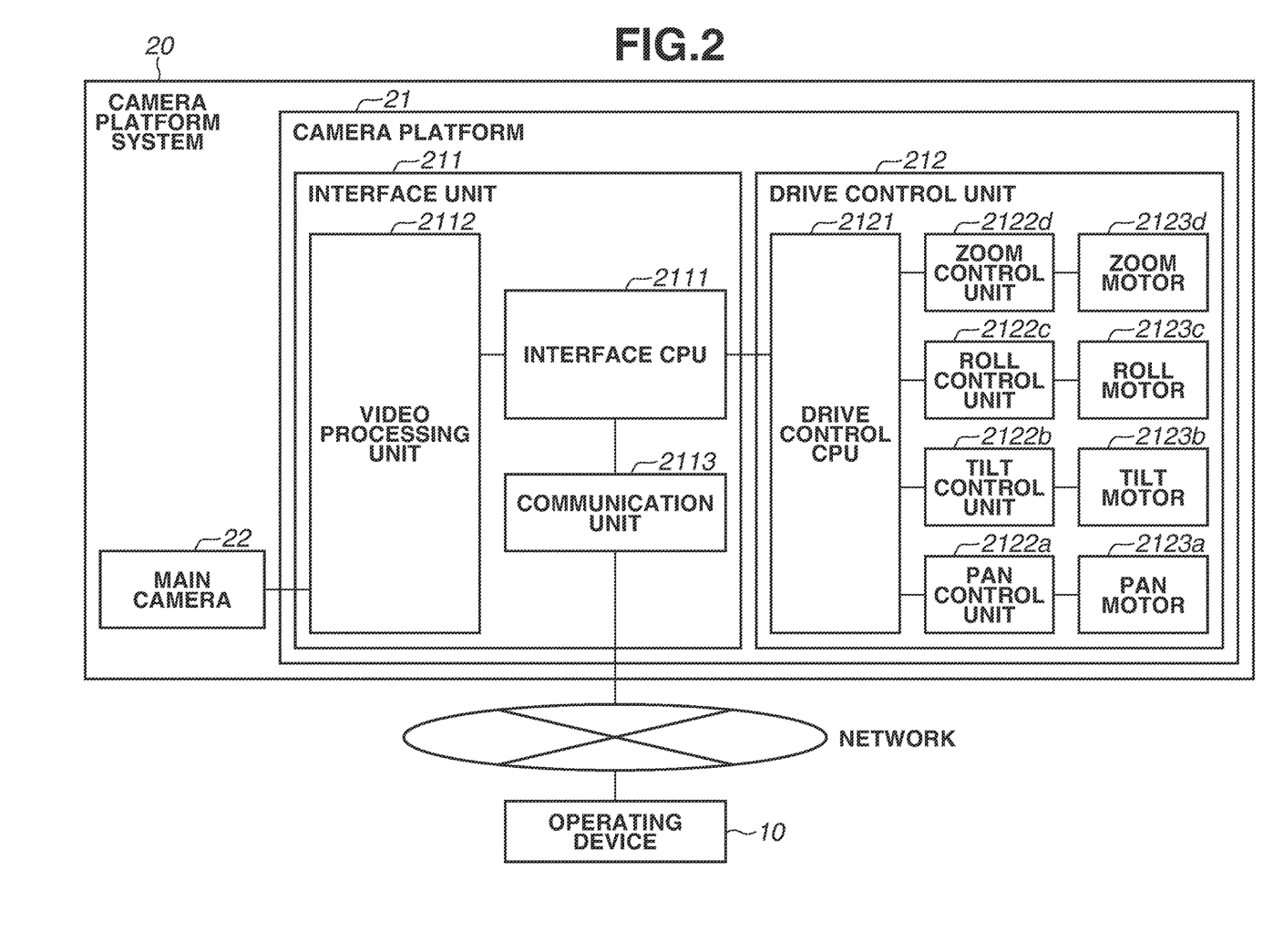
FIG. 2 is a block diagram illustrating a configuration of the camera platform apparatus according to the first example embodiment.

FIG. 1 is a perspective view of a camera platform system (camera platform apparatus) 20 according to the present example embodiment. FIG. 2 is a block diagram of the camera platform system 20 in the present example embodiment.

Directions indicated by arrows in FIG. 1 are defined as an X direction, a Y direction, and a Z direction. The X direction corresponds to left and right, the Y direction corresponds to up and down, and the Z direction corresponds to front and rear. The Z direction is an optical axis direction of a camera 22 when the camera (image pickup unit) 22 is fixed to a camera stand 24. A face viewed from an object side (upstream of the optical axis) when a lens (image pickup optical system) 23 is mounted to the camera 22 is defined as a front face, and a face viewed from the camera 22 opposite to the front face is defined as a rear face. A face viewed from a right side relative to the front face is defined as a right side face, a face viewed from a left side relative to the front face is defined as a left side face, a face viewed from above relative to the front face is defined as a top face, and a face viewed from below relative to the front face is defined as a bottom face. When an object is projected in the Z direction, the front face and the rear face have areas; however, the right side face, the left side face, the top face, and the bottom face do not have areas (i.e., these faces are line segments).

A camera rotation system according to the present example embodiment includes an operating device 10 and the camera platform system 20. When an operator operates the operating device 10, an operation instruction corresponding to an operation content is transmitted from the operating device 10 to the camera platform system 20 via a network. The camera platform system 20 performs control corresponding to the received operation instruction, and as a result, it is possible to remotely operate the camera platform system 20 from the operating device 10.

The camera platform system 20 includes a camera platform 21 (first base portion), a seat 27, the camera (image pickup unit) 22, the lens (image pickup optical system) 23 mounted on the camera 22, and a rotator unit 25. The rotator unit 25 includes a fixing unit 29 (second base portion) and an inner ring 252 supported by fixing unit 29. The camera platform 21 and the fixing unit 29 are included in a base unit. Further, the stand (camera stand 24) to which the camera 22 is fixable is connected to the inner ring 252 included in a rotation unit.

The camera platform system 20 in which the camera 22 to which the lens 23 is connected is not fixed to the camera platform system 20 serves as a camera platform unit.

The camera platform 21 is connected to the seat 27, and performs panning drive movable in a horizontal direction (pan direction) with respect to the seat 27. The fixing unit 29 is connected to the camera platform 21, and the fixing unit 29 performs tilting drive movable in a vertical direction (tilt direction) with respect to the camera platform 21. The inner ring 252 being the rotation unit performs rotational drive rotatable in an optical axis center direction (roll direction) with respect to the fixing unit 29.

The camera platform 21 controls drives in the pan direction, the tilt direction, and the roll direction. The camera platform 21 includes an interface unit 211 and a drive control unit 212. The interface unit 211 mainly processes communication and a video, and the drive control unit 212 mainly controls various types of motors. Although not described in detail, the camera platform 21 undergoes a typical dust prevention and drip-proof such as use of a rubber member for a mating portion or the like so that careful consideration is given to the camera platform 21.

The interface unit 211 includes an interface central processing unit (CPU) 2111, a video processing unit 2112, and a communication unit 2113. The drive control unit 212 includes a drive control CPU 2121, a motor control unit 2122 including a pan control unit 2122a, a tilt control unit 2122b, a roll control unit 2122c, and a zoom control unit 2122d, and a motor 2123 including a pan motor 2123a, a tilt motor 2123b, a roll motor 2123c, and a zoom motor 2123d.

An operation instruction from the operating device 10 is transmitted via the communication unit 2113 to the interface CPU 2111. If the operation instruction is a pan drive control instruction, the drive instruction is transmitted to the drive control unit 212 and a command is given via the drive control CPU 2121 to the pan control unit 2122a. The pan motor 2123a is driven in response to the pan drive control instruction.

Similarly, if the operation instruction is a tilt drive control instruction, the tilt motor 2123b is controlled via the tilt control unit 2122b. Further, if the operation instruction is a roll control instruction, the roll motor 2123c is controlled via the roll control unit 2122c. Moreover, if the operation instruction is a zoom control instruction, the zoom motor 2123d is controlled via the zoom control unit 2122d. Therefore, the drive control unit 212 functions as a drive unit for a camera.

The rotator unit 25 in FIG. 1 including the fixing unit 29 and the inner ring 252 is a rotation mechanism configured to rotate the camera 22 in the roll direction, and includes the above-described roll motor 2123c out of the drive control unit 212.

The video processing unit 2112 transmits a video output from the camera 22 to the interface CPU 2111. The interface CPU 2111 transmits a video from each of the cameras and communication data usable to operate each of the cameras in the operating device 10 (information on a position and an attitude of the camera, for example) via the communication unit 2113 to the operating device 10 so that the video and the communication data are displayed in the operating device 10. When one transmission path is used in transmitting a video from each of the cameras to the operating device 10, it is possible to decrease a delay between videos as compared to a case where a plurality of transmission paths is used for each of the videos.

Next, with reference to FIG. 3, a configuration of the rotator unit 25 including the fixing unit 29 being a portion of the base unit and the inner ring 252 being the rotation unit, will be described.

Figure 3:
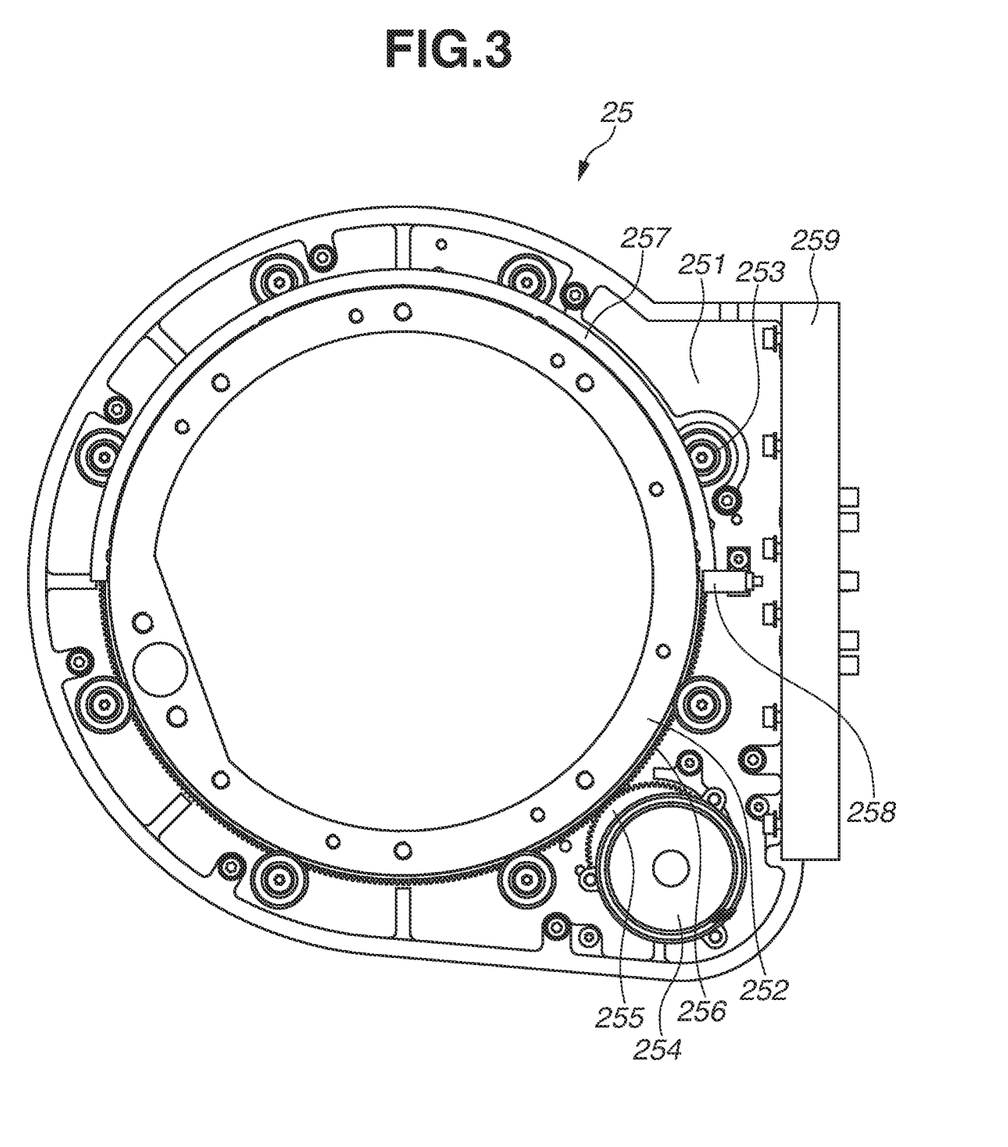
FIG. 3 is a diagram of a rotator unit according to the first example embodiment as viewed from a rear face.

FIG. 3 is a diagram of the rotator unit 25 as viewed from the rear face side. The inner ring 252, which is connected to the camera stand 24, rotates around an optical axis (Z axis) of the camera 22. A plurality of bearing units 253 is circumferentially arranged, and the inner ring 252 is rotatably supported relative to a frame 251 being a portion of the fixing unit 29 via the plurality of bearing units 253. The rotation drive unit 254, in which a motor (not illustrated) and a speed reducer (not illustrated) are included, is coupled to an inner ring gear 256 provided on an outer periphery of the inner ring 252 via a motor gear 255 being a portion of the rotation drive unit 254.

A sensor blade 257, which is coupled to a half part of the outer periphery of the inner ring 252, rotates together with the inner ring 252. When an end of the sensor blade 257 enters a photointerrupter 258 provided on the frame 251, a rotation origin is detected. The rotator unit 25 is connected to a tilting axis of the camera platform 21 in FIG. 1, with a screw (not illustrated), by a mounting plate 259, and is rotatable in the tilt direction with respect to the camera platform 21. The bearing unit 253 and the photointerrupter 258 each use waterproof components, and a motor (not illustrated) inside the rotation drive unit 254 is covered with a waterproof case. This is because objects to be covered with a protective cover described below are the camera 22 and the lens 23 mounted to the camera, and thus, it may be desirable to ensure waterproofness for each of the electric components included in the rotator unit 25.

With reference to FIGS. 4A, 4B, 4C, 4D, and 5, a detailed configuration of the protective cover (protective member), a method for mounting the protective cover to the camera platform system 20, and a receiving section configured to receive the protective cover will be described.

Figure 4A:
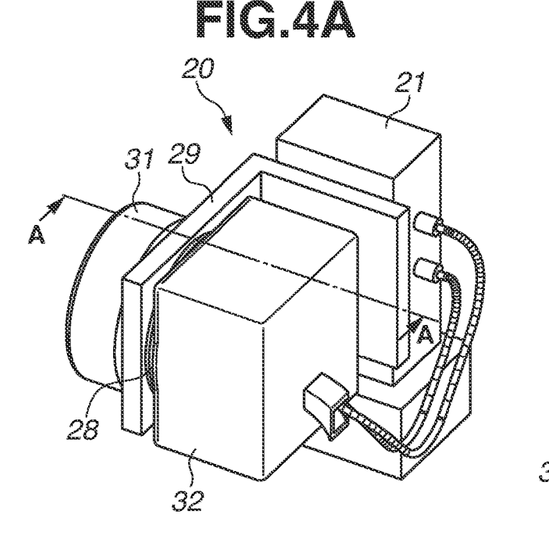
FIG. 4A is a perspective view in which protective covers are mounted to a plurality of receiving sections according to the first example embodiment.
Figure 4B:
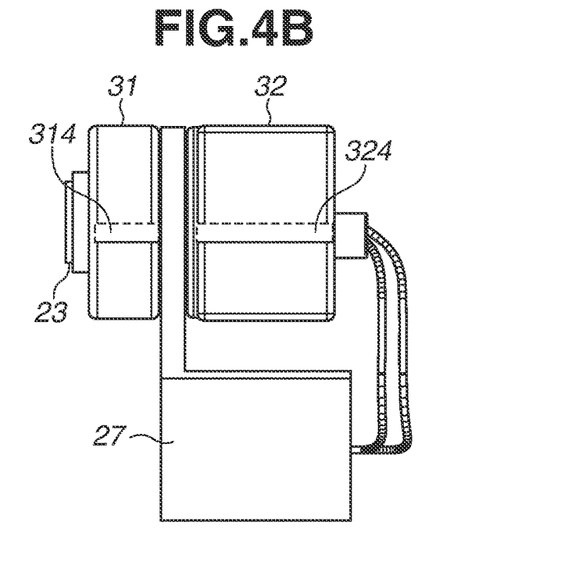
FIG. 4B is a bottom view in which the protective covers are mounted to the plurality of receiving sections according to the first example embodiment.
Figure 4C:
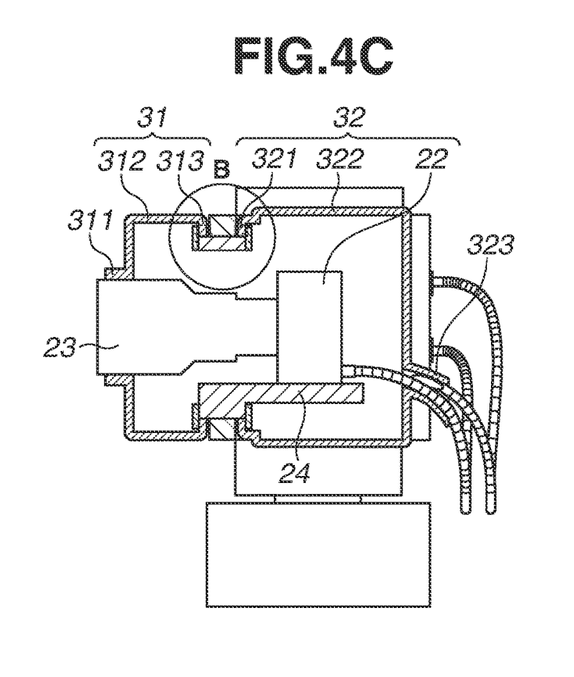
FIG. 4C is a cross-sectional view in which the protective covers are mounted to the plurality of receiving sections according to the first example embodiment.
Figure 4D:
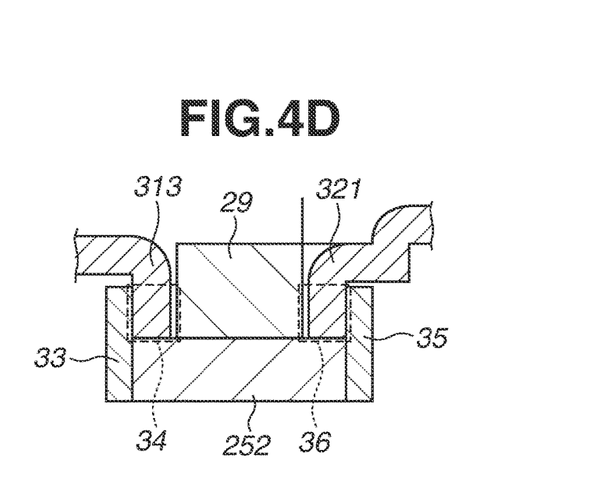
FIG. 4D is an enlarged cross-sectional view in which the protective covers are mounted to the plurality of receiving sections according to the first example embodiment.

FIG. 4A is a perspective view obtained when the protective cover (protective member) is mounted to the camera platform system 20, FIG. 4B is a view obtained when FIG. 4A is viewed from the bottom face, FIG. 4C is a cross-sectional view taken along line A-A of FIG. 4A, and FIG. 4D is an enlarged view of portion B illustrated in FIG. 4C.

A plurality of detachable protective covers includes a front protective cover (first protective member) 31 configured to mainly protect the lens 23 and a rear protective cover (second protective member) 32 configured to mainly protect the camera 22. The front protective cover 31 and the rear protective cover 32 are mounted to protect the camera 22 and the lens 23 from water droplets such as rain, dust, and the like.

Configurations of the front protective cover 31 and the rear protective cover 32 will be described. In the present example embodiment, the protective covers are made of a material not allowing rain to pass through the protective covers, such as a soft waterproof cloth. The front protective cover 31 includes a lens fixing unit 311, a lens protective unit 312, a rotator fixing unit 313, and a bottom stopper 314. The rear protective cover 32 includes a rotator fixing unit 321, a camera protective unit 322, a cable outlet 323 being an entrance/exit of a cable connecting the camera platform 21 to the camera 22, and a bottom stopper 324. The stoppers 314 and 324 are detachable members such as Velcro (registered trademark), and the protective covers can be unfolded by detaching the stoppers 314 and 324. Here, the protective covers are unfolded, and thus, it is possible to mount the protective covers at a later stage even if the camera platform 21 and the camera 22 are connected by the cable, which is convenient for installation.

Further, protective covers not including the stoppers 314 and 324 (that is, not to be unfolded) may be employed, and in this case, it is possible to prevent entering of water from the stoppers 314 and 324 of the protective covers, and thus, improvement of the water prevention is expected.

Next, description will be given of mounting of the front protective cover 31 and the rear protective cover 32 to the camera platform system 20.

When the front protective cover 31 is mounted to the lens 23, the front protective cover 31 surrounds an outer periphery near a front lens, which corresponds to a position not intervening in an angle of view during capturing an image.

The camera platform system 20 includes a plurality of receiving sections configured to receive a plurality of protective covers. Among the plurality of receiving sections, a first receiving section is provided on a first side in a rotation axis direction of the inner ring 252, and a second receiving section is provided on a second side in the rotation axis direction of the inner ring 252.

As illustrated in FIG. 4D, the inner ring 252, a front flange member 33 fixed, with a screw (not illustrated), to the first side in the rotation axis direction of the inner ring 252, and the fixing unit 29 define a groove 34 being the receiving section (first receiving section) of the front protective cover 31.

At this time, as a result of a diameter of the front flange member 33 being larger than a diameter of the inner ring 252, the groove 34 is formed.

Similarly, a rear flange member 35 is fixed to the second side in the rotation axis direction of the inner ring 252, and the inner ring 252, the rear flange member 35, and the fixing unit 29 define a groove 36 being the receiving section (second receiving section) of the protective cover 32. Likewise, a diameter of the rear flange member 35 is larger than the diameter of the inner ring 252.

Here, at least one portion included in each of the plurality of receiving sections 34 and 36 rotates together with the inner ring 252.

Further, at least one portion of each of the plurality of receiving sections is fixed to the base unit. The inner ring 252 is fixed to the fixing unit 29 being the base unit.

Next with reference to FIG. 5, a method for fixing the protective cover to the receiving section will be described. Here, the front protective cover 31 mounted to the first receiving section will be described; however, the rear protective cover 32 mounted to the second receiving section is also fixed by the same fixing method.

Figure 5:
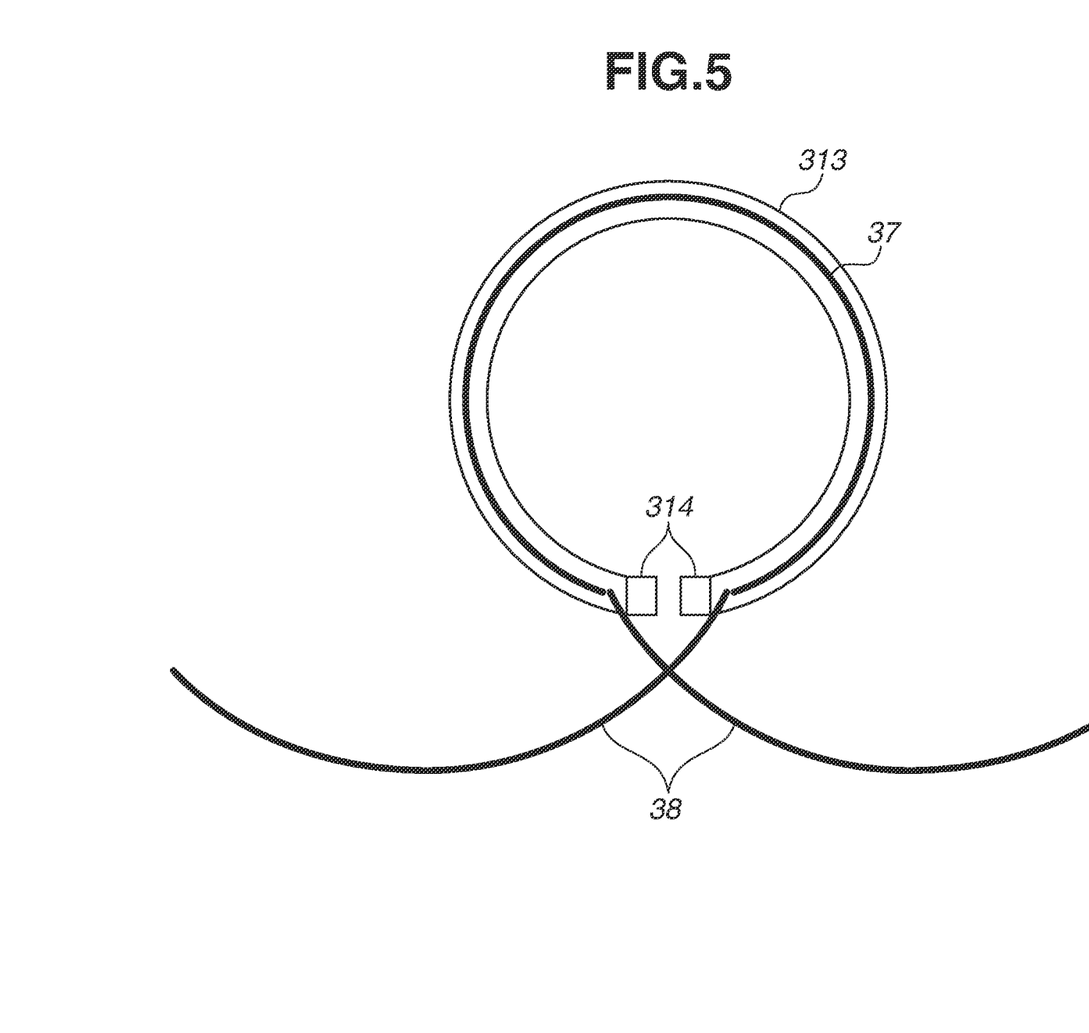
FIG. 5 is a diagram schematically illustrating a cross-sectional view of the protective cover.

FIG. 5 illustrates a simplified cross section in the vertical direction (Y direction) with respect to the optical axis (Z axis) of the rotator fixing unit 313. As described above, the plurality of receiving sections is capable of receiving the plurality of protective covers including a fixation unit. The rotator fixing unit 313 of the protective cover contains a rubber portion 37 having an elastic force, and strings 38 are provided at both ends of the rubber portion 37.

Firstly, the rubber portion 37 is engaged, via the front protective cover 31, with the groove 34 being the first receiving section (first fixation unit). At this time, the rotator fixing unit 313 abuts against and is engaged with at least one face rotating together with the rotation of the inner ring 252, out of faces configuring the groove 34 so that the front protective cover 31 is rotated together with rotation of the inner ring 252.

Thereafter, the strings 38 are further wound and tied to the groove 34 for fixation (second fixation unit).

As described above, the front protective cover 31 is fixed to the groove 34 being the first receiving section. In the same way, the rear protective cover 32 is also fixed to the groove 36 being the second receiving section. With such a structure, the inner ring 252 is wound by the strings 38 after the front protective cover 31 or the rear protective cover 32 is temporarily held by expansion and contraction of the rubber portion 37, and thus, it is possible firmly fix the front protective cover 31 or the rear protective cover 32. As a result, the protective cover is prevented from being removed while the camera platform system 20 is used.

With the above configuration, when the inner ring 252 rotates around the optical axis (Z axis) of the camera 22, the front protective cover 31 and the rear protective cover 32 fixed to the grooves 34 and 36 also rotate around the optical axis (Z axis) of the camera 22. Therefore, it is possible to alleviate an influence on an operation during a rotation operation of the inner ring 252. An example of the influence includes a case where the protective cover is entangled during a rotation operation of the inner ring 252.

The rotator unit 25 is fixed to the camera platform 21 and is capable of performing pan and tilt operations. Therefore, the front protective cover 31 and the rear protective cover 32 are also capable of performing the pan and tilt operations, where the front protective cover 31 and the rear protective cover 32 are fixed to the plurality of receiving sections including the inner ring 252, the front flange member 33 and the rear flange member 35 fixed to the inner ring 252, and the fixing unit 29.

Thus, it is possible to provide the protective covers that alleviate an influence on pan, tilt, and roll operations of the camera platform system 20 while protecting the camera 22 and the lens 23.

In the present example embodiment, the protective cover made of a soft waterproof cloth is described; however, even if the protective cover is a hard cover, the same effect can be obtained. If the protective cover is hard, the protective cover is preferably as small as possible. If a soft protective cover is mounted, further miniaturization can be expected, but the soft protective cover is likely to be twisted during a rotation operation. To avoid the twisting, if the soft protective covers are mounted in the plurality of receiving sections 34 and 36 as described in the present example embodiment, it is possible to obtain an effect that an influence on an operation is alleviated.

In the present example embodiment, the lens fixing unit 311, the stopper 314, and the stopper 324 employ Velcro (registered trademark), but this is not limiting. For example, the lens fixing unit 311, the stopper 314, and the stopper 324 may employ a magnet, a tape, a fastener, or the like, which can provide an equivalent fixing performance. Similarly, the rotator fixing unit 313 and the rotator fixing unit 321 employ rubber and a string, but this is not limiting. The rotator fixing unit 313 and the rotator fixing unit 321 may employ a magnet, a tape, a fastener, and Velcro (registered trademark) or the like, which can provide an equivalent fixing performance.

It is possible to provide a similar effect in a case of a configuration in which there are no bottom stopper 314 and stopper 324 allowing the protective cover to be unfolded.

Second Example Embodiment

Next, with reference to FIGS. 6A and 6B, a configuration according to a second example embodiment of the present disclosure will be described. In the present example embodiment, the same reference numerals are given to components similar to those in the first example embodiment, and description thereof will be omitted.

Figure 6A:
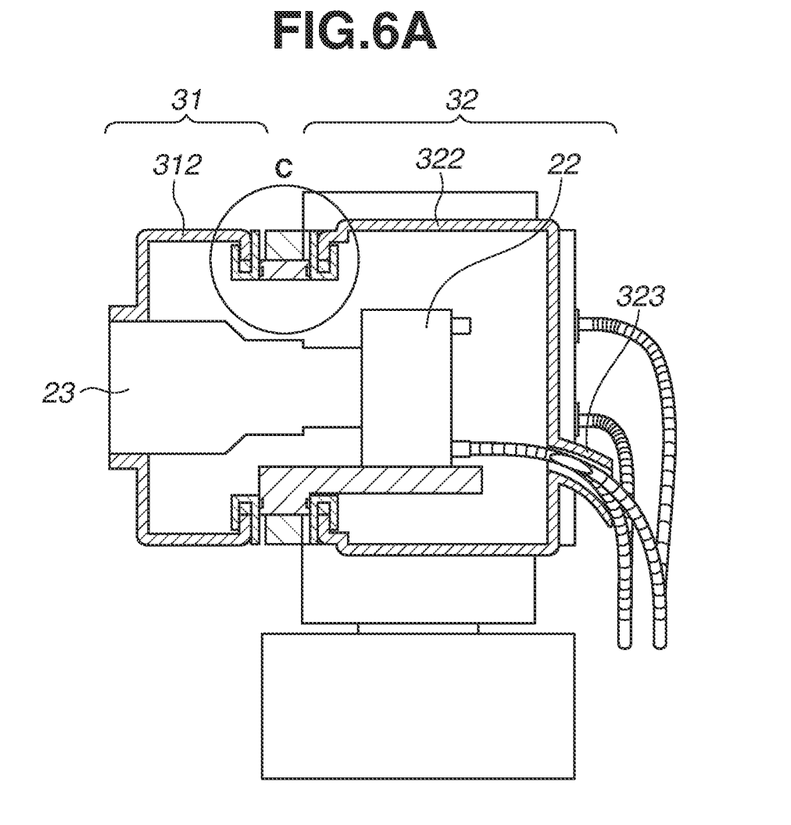
FIG. 6A is a cross-sectional view in which protective covers are mounted to a plurality of receiving sections according to a second example embodiment.
Figure 6B:
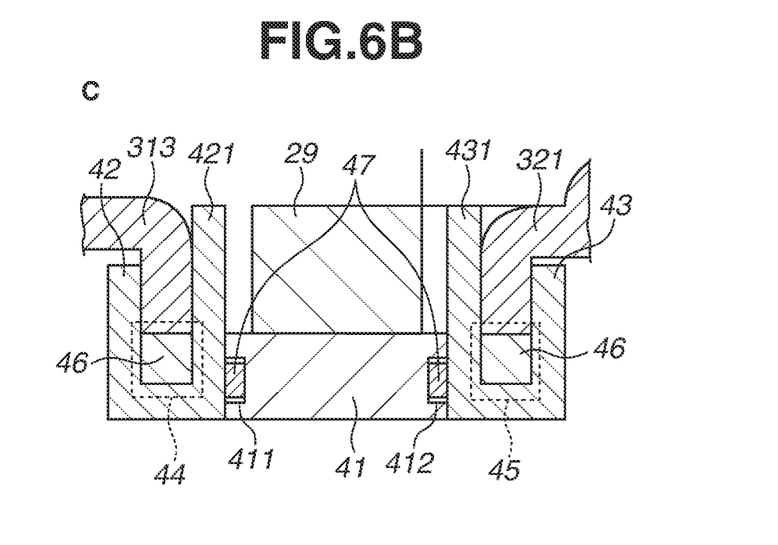
FIG. 6B is an enlarged cross-sectional view in which the protective covers are mounted to the plurality of receiving sections according to the second example embodiment.

FIGS. 6A and 6B are diagrams illustrating a plurality of receiving sections different from the first example embodiment in FIGS. 4A, 4B, 4C, and 4D, where FIG. 6A is a cross-sectional view of the camera platform system 20 cut similarly to the cross-sectional view taken along line A-A of FIG. 4A, and FIG. 6B is an enlarged view of portion C illustrated in FIG. 6A. The description of components that are the same as those in FIGS. 4A, 4B, 4C, and 4D is omitted, and only different features will be described.

The camera platform system 20 according to the present example embodiment includes flange members (plurality of receiving sections) 42 and 43. The flange members 42 and 43 include receiving faces 421 and 431, and the flange members 42 and 43 including the receiving faces 421 and 431 are fixed to a first side and a second side of the inner ring 41 with screws (not illustrated), respectively. The second example embodiment differs from the first example embodiment in that the flange members 42 and 43 are provided with a third receiving section 44 and a fourth receiving section 45, respectively. In the present example embodiment, recessed grooves are provided in the rotation axis direction of the flange members 42 and 43. The flange members 42 and 43 fixed to the inner ring 41 are capable of rotation together with the rotation of the inner ring 41.

If the protective covers are mounted, the rubber portions 37 abut against and is engaged with the plurality of receiving sections 44 and 45 via the protective covers.

Further, when the protective covers are mounted to the plurality of receiving sections, for example, a first protective cover may be mounted to the groove 44 of the present example embodiment and a second protective cover may be mounted to the groove 34 of the first example embodiment. Further, a plurality of receiving sections (grooves) may be provided in the rotational axis direction of the inner ring 41, and the protective cover may be mounted in the groove.

Further, in the present example embodiment, sponge members 46 being elastic bodies are fixed to the grooves 44 and 45 by a method such as adhesion. The front protective cover 31 and the rear protective cover 32 are mounted to the grooves 44 and 45 via the sponge members 46. The sponge members 46 have elasticity, and thus, the sponge members 46 are more closely fixed to the grooves 44 and 45 by mounting the protective covers. The sponge members 46 are made of a water-impermeable material (for example, a closed-cell structure) and has an effect of preventing water from entering from a contact portion between the protective cover and the groove.

Further, grooves 411 and 412 configured to fix the flange members 42 and 43 to the inner ring 41 with screws (not illustrated) are provided on surfaces of the inner ring 41. In the grooves 411 and 412, sponge members 47 being the elastic bodies are arranged to fill the grooves 411 and 412. The sponge members 47 are also made of a water-impermeable material as in the sponge members 46, and prevents water from entering from contact portions between the inner ring 41 and the flange members 42 and 43. A hole through which a screw (not illustrated) passes is provided in the sponge members 47 according to the present example embodiment.

Further, in the present example embodiment, the flange members 42 and 43 rotate together with the rotation of the inner ring 41 and thus, unlike in a case where the plurality of receiving sections includes the fixing unit 29 as in the first example embodiment, the fixing unit 29 and the protective cover do not slide during a rotation operation. Therefore, it is possible to prevent loss of driving torque and generation of sliding noise. In addition, the sponge members 46 and 47 are provided at the contact portions between the components, and thus, it is possible to improve waterproofness of the contact portions.

Further, the receiving faces 421 and 431 serve as walls so that water entering an outer peripheral area of the inner ring 41 is not directly transmitted to the grooves 44 and 45. Therefore, it is possible to further improve the waterproofness of the contact portions between the protective covers and the grooves 44 and 45.

The sponge members 46 and 47 can provide a similar effect even if the sponge members 46 and 47 are applied to similar portions in an example embodiment other than the present example embodiment.

Third Example Embodiment

Next, with reference to FIGS. 7A and 7B, a configuration according to a third example embodiment of the present disclosure will be described. In the present example embodiment, the same reference numerals are given to components similar to those in another example embodiment, and description thereof will be omitted.

Figure 7A:
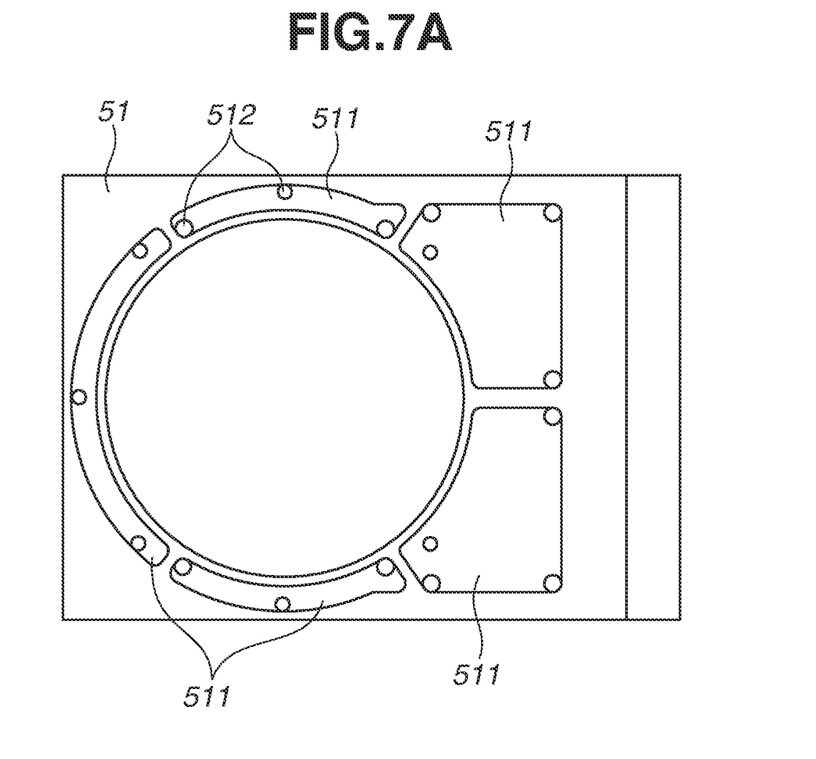
FIG. 7A is a rear view of a frame according to the second example embodiment.
Figure 7B:
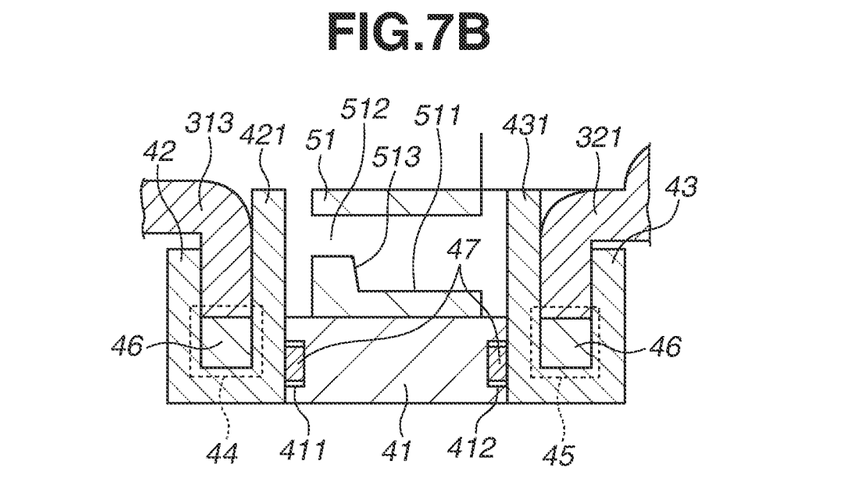
FIG. 7B is an enlarged view obtained when the frame according to the second example embodiment is attached to a camera platform system.

FIG. 7A is a rear view of a frame 51 according to the present example embodiment, and FIG. 7B is an enlarged cross-sectional view, similar to the cross-sectional view taken along line A-A of FIG. 4A, obtained when the frame 51 according to the present example embodiment is incorporated into the camera platform system 20.

The camera platform system 20 according to the present example embodiment is different from the first and second example embodiments only in the frame 51 of the rotator unit 25. As illustrated in FIGS. 7A and 7B, the frame 51 is provided with a recess 511 in the Z direction to facilitate mounting of members such as a bearing unit 253 and to increase the strength of the frame 51. Further, the recess 511 is provided with a plurality of through holes 512. The bearing unit 253, the rotation drive unit 254, the photointerrupter 258, and the like may be arranged, in the recess 511, by using a mounting mechanism (not illustrated).

The camera platform system 20 is capable of changing an angular attitude of the rotator unit 25 about the X axis in FIG. 1 by a tilt operation. For example, if the camera platform system 20 is suspended from a ceiling and the lens 23 captures a −Y direction, the recess 511 of the frame 51 opens in a +Y direction. If the rotator unit 25 receives a rainfall or the like in this state, the rainfall enters the recess 511 from the +Y direction, and water accumulates in the recess 511. Depending on an amount of rainfall, the bearing unit 253, the rotation drive unit 254, and the like mounted to the frame 51 may be submerged in water in the recess 511. Generally, waterproof specifications of the bearing unit 253 and the like has several acceptable levels for a waterproof function, and as the level of waterproofing increases, the members tend to increase in size. Therefore, it is desirable to employ a member with the minimum waterproof performance, and it is preferable to avoid a situation where the member is submerged in water. The frame 51 according to the present example embodiment is provided with the plurality of through holes 512 in the recess 511, water in the recess 511 is discharged from the through holes 512, and thereby, it is possible to avoid the bearing unit 253 and the like from being submerged in water.

Further, a slope 513 inclined toward the through holes 512 is provided on a face of the recess 511 so that the water in the recess 511 is guided to the through holes 512. Therefore, the water in the recess 511 can be collected into the through holes 512 and can be efficiently drained out of the frame 51. Next, as described in the second example embodiment, the water discharged from the frame 51 is guided in a direction away from the optical axis by the receiving face 421 serving as a protective wall, and is drained from the rotator unit 25. Therefore, the water accumulated inside the recess 511 can be drained outside of the rotator unit 25 without passing through the contact surface between the front protective cover 31 and the groove 44, and thus, higher waterproof performance can be secured.

With the above-described configuration, it is possible to efficiently drain water accumulated inside the rotator unit 25 to the outside of the rotator unit 25 without impairing the waterproof performance, and thus, to reduce the cost and size of the components. The plurality of through holes 512 is provided on a circumference of the frame 51, and thus, a similar effect can be obtained in various installation states and attitudes. For example, a similar waterproof effect can be obtained even if the camera platform apparatus is installed upside down or in a lateral position. In the present example embodiment, the description is provided based on the example in which the recess 511 is arranged on the rear side of the frame 51; however, even if the recess 511 is arranged on the front side, the receiving face 431 may provide a similar operation, and thus, a similar effects can be obtained.

Fourth Example Embodiment

Next, with reference FIGS. 8A, 8B, and 8C, a configuration according to a fourth example embodiment of the present disclosure will be described. In the present example embodiment, the same reference numerals are given to components similar to those in another example embodiment, and description thereof will be omitted.

Figure 8A:
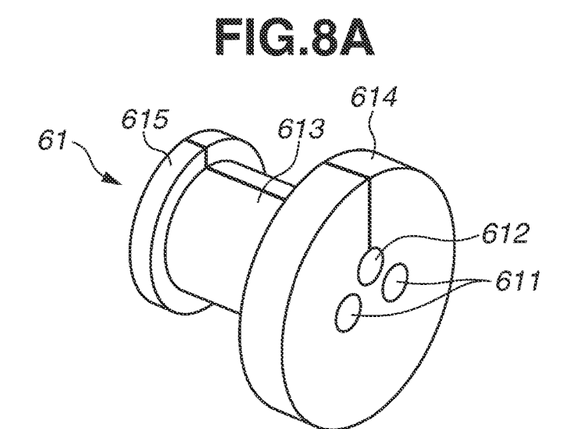
FIG. 8A is a perspective view of a cable cushion according to a third example embodiment.
Figure 8B:
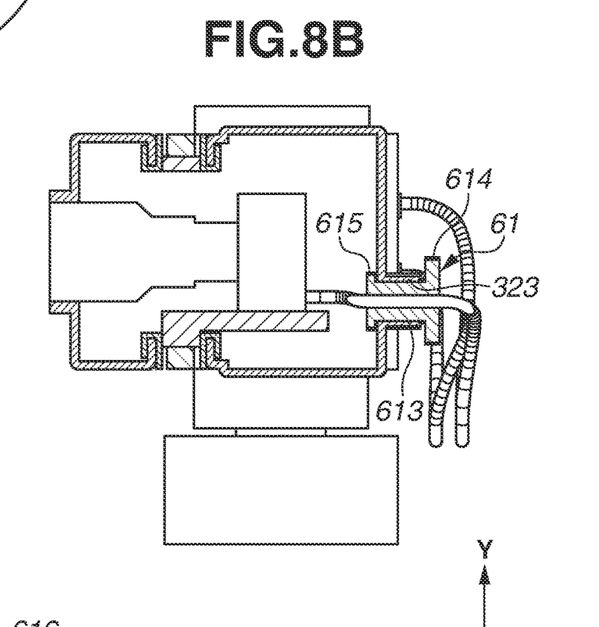
FIG. 8B is a cross-sectional view of the cable cushion according to the third example embodiment.
Figure 8C:
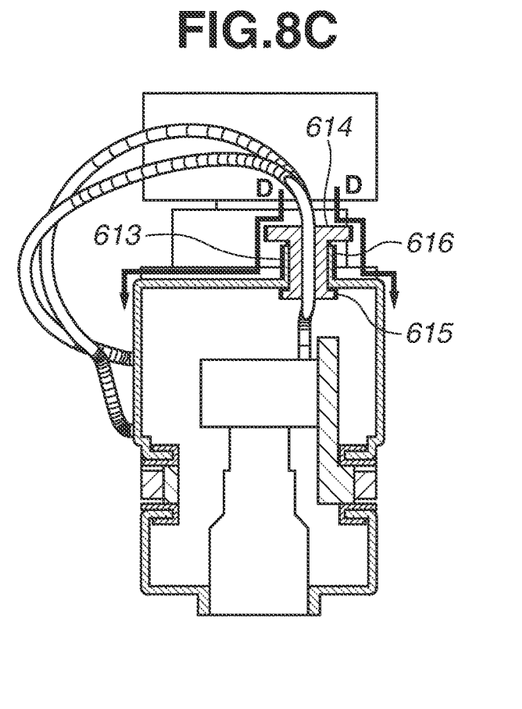
FIG. 8C is an explanatory diagram of the cable cushion according to the third example embodiment.

FIG. 8A is a perspective view of a cable cushion 61 in the present example embodiment, FIG. 8B is a cross-sectional view similar to the cross-sectional view taken along line A-A of FIG. 4A in the present example embodiment, and FIG. 8C is a view obtained when the camera 22 is turned downward by tilting the camera platform system 20 in FIG. 8B to be in an underslung state.

With reference to FIG. 8A, a configuration of the cable cushion 61 mounted to the cable outlet 323 of the protective cover 32 will be described.

The cable cushion 61 is made of an impermeable and elastic material such as sponge material or rubber material, and the cable cushion 61 is provided with holes 611 through which a plurality of cables passes and a hole 612 with a slit. The hole 612 is provided with the slit toward the outer diameter of the cable cushion 61.

When a cable is caused to pass through each of the holes 611 without a slit, the cable cannot pass through the hole 611 if a connector is crimped to the cable first. Therefore, the cable is caused to pass through the hole 611 before the connector is crimped to the cable, and then the connector is crimped to the cable. The hole 612 with a slit can cope with increase or decrease in the number of cables. Therefore, even if the number of cables to which a connector is crimped increases, the slit is opened to pass the cable through the hole 612 from a side face. The camera 22 and the camera platform 21 are connected with at least one cable crimped with a connector.

If a cable is not used, the hole 612 is filled with a spacer or the like for waterproofing. In addition, the cable cushion 61 includes a small diameter unit 613 being a fixing unit configured to fix the cable outlet 323, a large diameter unit 614 extending from the small diameter unit 613 and configured to protect the cable outlet 323 from water droplets, and a hook unit 615 configured to prevent the mounted cable cushion 61 from being easily removed.

With reference to FIGS. 8B and 8C, a configuration of the camera platform system 20 when the cable cushion 61 is employed and a role of the cable cushion 61 will be described.

As illustrated in FIG. 8B, the cable cushion 61 is fixed to the cable outlet 323 provided in the rear protective cover 32. Cables are previously inserted into the cable cushion 61 through the hole 611 as described above, and the cable cushion 61 is fixed by winding, around the small diameter unit 613, a string (not illustrated) provided in the cable outlet 323. Although in the present example embodiment, the string is employed as an example, another fixing method such as Velcro (registered trademark) method or a fastener method may be employed. In the fixed cable cushion 61, the hook unit 615 and the large diameter unit 614 have a larger diameter than the small diameter unit 613, and thus, the fixed cable cushion 61 is prevented from being removed when the rear protective cover 32 is pulled in the Z direction.

If the camera platform system 20 is used in a state of being hung from the ceiling, the camera platform 21 is fixed to the ceiling as illustrated in FIG. 8C, and the camera 22 is turned downward to capture an image. If an image is captured without the cable cushion 61 in such an attitude, water droplets may enter from a minute gap in an area for fixing the cable outlet 323 and the cable. Further, if a plurality of cables is fixed to the cable outlet 323, water droplets may also enter from a gap between the cables. An arrow D indicates a path along which water droplets dropped from above travel. The water droplets dropped from above hit the large diameter unit 614 and fall while being transmitted to the rear protective cover 32 along an external form of the large diameter unit 614. A minute gap 616 generated when the cable cushion 61 is mounted to the cable outlet 323 is always protected from the water droplets by the large diameter unit 614, and thus, it is possible to prevent the water droplets from entering the minute gap 616. In addition, cables are fixed to the holes 611 of the cable cushion 61, and thus, it is also possible to prevent water droplets from entering through a gap between the cables.

In a horizontal attitude of the camera platform system 20 as illustrated in FIG. 1, it is assumed that the minute gap 616 is so minute that no water droplets enter.

With the above-described configuration, it is possible to prevent water droplets from entering even if an image is captured in an attitude in which water droplets easily enter from the cable outlet 323.

As mentioned above, although the example embodiments of the present disclosure are described, the present disclosure is not limited to these example embodiments, and various modifications and changes are possible within the range of the gist of the present disclosure.

Further, the present disclosure may also be embodied by processing in which a program that realizes functions according to the above-described example embodiments is provided to a system or apparatus through a network or a storage medium, and one or more processors in a computer of the system or apparatus read and execute the program. The present disclosure may also be embodied by a circuit (for example, an application-specific integrated circuit (ASIC)) that realizes one or more functions.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2019-086273, filed Apr. 26, 2019, which is hereby incorporated by reference herein in its entirety.

What is claimed is:

1. A camera platform apparatus, comprising:
   a base unit;
   a rotation unit rotatable with respect to the base unit;
   a stand being connected to the rotation unit and being capable of fixing an image pickup unit; and
   a plurality of receiving sections configured to receive a plurality of detachable protective units,
   wherein among the plurality of receiving sections, a first receiving section is provided on a first side in a rotation axis direction of the rotation unit, and a second receiving section is provided on a second side in the rotation axis direction of the rotation unit.

2. The camera platform apparatus according to claim 1, wherein at least a first portion of each of the plurality of receiving sections rotates together with the rotation unit.

3. The camera platform apparatus according to claim 1, wherein at least a first portion of each of the plurality of receiving sections is fixed to the base unit.

4. The camera platform apparatus according to claim 1, wherein a rotatable inner ring forms a first portion of the plurality of receiving sections.

5. The camera platform apparatus according to claim 1, wherein a groove is provided in each of the plurality of receiving sections.

6. The camera platform apparatus according to claim 1, wherein the plurality of detachable protective units including a fixation unit is mountable to the plurality of receiving sections.

7. The camera platform apparatus according to claim 1, wherein the base unit is provided with a recess configured to receive a member,
   wherein a hole is provided in the recess, and
   wherein an incline is provided toward the hole in the recess.

* * * * *